US009820155B2

(12) United States Patent
Chen (10) Patent No.: US 9,820,155 B2
(45) Date of Patent: Nov. 14, 2017

(54) CLOUD SITE CONTROLLER MANAGER (71) Applicant: Relay2, Inc., Milpitas, CA (US)

(72) Inventor: Jihn-Shiarn Chen, Fremont, CA (US)

(73) Assignee: Relay2, Inc., Milpitas, CA (US)

( * ) Notice: Subject to any disclaimer, the term of this patent is extended or adjusted under 35 U.S.C. 154(b) by 0 days.

(21) Appl. No.: 14/274,743

(22) Filed: May 11, 2014

(65) Prior Publication Data

US 2014/0334405 A1    Nov. 13, 2014

Related U.S. Application Data (60) Provisional application No. 61/821,852, filed on May 10, 2013.

(51) Int. Cl.
| | |
|---|---|
| H04W 16/06 | (2009.01) |
| H04L 5/00 | (2006.01) |
| H04W 72/04 | (2009.01) |
| H04W 28/18 | (2009.01) |
| H04W 16/24 | (2009.01) |
| H04W 60/00 | (2009.01) |
| H04W 88/12 | (2009.01) |
| H04W 12/06 | (2009.01) |
| H04W 16/14 | (2009.01) |

(Continued)

(52) U.S. Cl.
CPC ........... H04W 16/06 (2013.01); H04L 5/0091 (2013.01); H04W 12/06 (2013.01); H04W 16/14 (2013.01); H04W 16/24 (2013.01); H04W 28/18 (2013.01); H04W 60/005 (2013.01); H04W 72/0406 (2013.01); H04W 88/12 (2013.01); H04L 61/2007 (2013.01); H04L 61/2061 (2013.01); H04L 67/02 (2013.01); *H04W 12/08* (2013.01); *H04W 24/02* (2013.01); *H04W 84/12* (2013.01); *H04W 88/08* (2013.01)

(58) Field of Classification Search
CPC ..... H04W 84/12; H04W 12/08; H04W 28/18; H04W 60/005; H04W 88/08; H04W 88/12; H04L 12/4641
USPC ......................................................... 370/329
See application file for complete search history.

(56) References Cited

U.S. PATENT DOCUMENTS

| | | | |
|---|---|---|---|
| 5,881,229 | A | 3/1999 | Singh et al. |
| 7,286,515 | B2 | 10/2007 | Olsen et al. |

(Continued)

FOREIGN PATENT DOCUMENTS

| | | |
|---|---|---|
| CN | 101595691 | 12/2009 |
| EP | 1757031 | 2/2007 |

OTHER PUBLICATIONS

International Application No. PCT/US2014/037613, International Search Report and Written Opinion dated Dec. 11, 2014.

(Continued)

*Primary Examiner* — Omer S Mian
*Assistant Examiner* — Nizam Ahmed
(74) *Attorney, Agent, or Firm* — Sheppard, Mullin, Richter & Hampton LLP (57) ABSTRACT

A method and system for virtualization of access points are disclosed. According to certain embodiments, a cloud site controller manager can automatically respond to a discovery request from a wireless access point by sending, to the wireless access point, an IP address and port information of a tenant controller associated with the tenant account information with which the wireless access point is in turn associated.

6 Claims, 9 Drawing Sheets

(51) Int. Cl.
  *H04L 29/12* (2006.01)
  *H04W 12/08* (2009.01)
  *H04W 24/02* (2009.01)
  *H04W 84/12* (2009.01)
  *H04W 88/08* (2009.01)
  *H04L 29/08* (2006.01)

(56) References Cited

U.S. PATENT DOCUMENTS

| | | |
|---|---|---|
| 7,826,515 B2 | 11/2010 | Reial |
| 9,294,507 B1 | 3/2016 | Roth et al. |
| 2002/0022483 A1 | 2/2002 | Thompson et al. |
| 2003/0188001 A1 | 10/2003 | Eisenberg et al. |
| 2004/0062270 A1* | 4/2004 | Son ............... H04L 12/2801 370/465 |
| 2004/0103282 A1* | 5/2004 | Meier ............. G06Q 20/3674 713/171 |
| 2005/0180348 A1 | 8/2005 | Burdick et al. |
| 2006/0002319 A1 | 1/2006 | Lee et al. |
| 2006/0094400 A1 | 5/2006 | Beachem et al. |
| 2006/0098653 A1 | 5/2006 | Adams et al. |
| 2006/0165103 A1 | 7/2006 | Trudeau et al. |
| 2007/0082677 A1* | 4/2007 | Donald Hart ...... H04W 16/18 455/456.1 |
| 2008/0181233 A1 | 7/2008 | Washam et al. |
| 2009/0054037 A1* | 2/2009 | Kaippallimalil ...... H04L 63/08 455/411 |
| 2009/0198808 A1 | 8/2009 | Cai et al. |
| 2009/0227282 A1 | 9/2009 | Miyabayashi et al. |
| 2010/0027516 A1 | 2/2010 | Nagarajan |
| 2010/0177714 A1 | 7/2010 | Hanaoka et al. |
| 2010/0325714 A1 | 12/2010 | Iyer et al. |
| 2011/0213854 A1 | 9/2011 | Haviv |
| 2011/0296046 A1 | 12/2011 | Arya |
| 2012/0147824 A1 | 6/2012 | Van der Merwe et al. |
| 2012/0185913 A1* | 7/2012 | Martinez ............ G06F 9/455 726/1 |
| 2013/0014102 A1 | 1/2013 | Shah |
| 2013/0031615 A1* | 1/2013 | Woodward ............ H04W 8/02 726/4 |
| 2013/0163515 A1 | 6/2013 | Yeoh et al. |
| 2013/0305332 A1 | 11/2013 | Narasimham et al. |
| 2014/0068030 A1 | 3/2014 | Chambers et al. |
| 2014/0068197 A1 | 3/2014 | Joshi et al. |
| 2014/0092884 A1 | 4/2014 | Murphy et al. |
| 2014/0105094 A1 | 4/2014 | Soundarajan |
| 2014/0157298 A1 | 6/2014 | Murphy |
| 2014/0280737 A1 | 9/2014 | Bicket et al. |
| 2015/0006737 A1 | 1/2015 | Chen et al. |
| 2015/0092603 A1 | 4/2015 | Aguayo et al. |

OTHER PUBLICATIONS

European Patent Application No. 14795030.7, Search Report dated Aug. 2, 2016.

European Telecommunications Standards Institute, "Network Functions Virtualisation (NFV); Use Cases," Document No. ETSI GS NFV 001 V.1.1.1, Oct. 2013.

European Patent Application No. 14795030.7, Partial Search Report dated Apr. 28, 2016.

* cited by examiner

| Subnet Address | Anchor AP address |
|---|---|
| 192.168.2.0/24 | 192.168.2.254 |
| 192.168.2.0/24 | 192.168.3.215 |
| ... | ... |

CLOUD SITE CONTROLLER MANAGER

CROSS REFERENCE TO RELATED APPLICATIONS

This application claims the benefit of U.S. Provisional Patent Application No. 61/821,852 filed May 10, 2013, entitled, "VIRTUAL ENTERPRISE ACCESS POINT CONTROL AND MANAGEMENT," by Chen et al., and which is hereby incorporated by reference in its entirety.

TECHNICAL FIELD

The present invention is directed to electronic communications, and more specifically to aspects of WiFi network architecture and services.

DETAILED DESCRIPTION

Methods, systems, user interfaces, and other aspects of the invention are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention. The specification and drawings are, accordingly, to be regarded in an illustrative rather than a restrictive sense.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well known to those of ordinary skill in the art are not described in detail to avoid obscuring aspects of the present invention.

According to certain embodiments, a virtual enterprise access point (VEAP) control and management system is used to provide enterprise-grade virtual access points (AP) and high performance enterprise AP hardware. According to certain embodiments, the deployment of enterprise-grade virtual APs obviates the need for deployment of a large number of APs and thus reduces signal interferences. Further, the VEAP system manages the APs in a centralized and coordinated manner. VEAP is also referred to as virtual access point (VAP) herein.

According to certain embodiments, the VEAP system encompasses a two-tier ownership model: 1) ownership of the enterprise AP hardware, and 2) ownership of the networking service using the enterprise AP hardware (herein referred to as "virtual AP").

For example, the owner of the enterprise AP hardware is preferably the landlord or owner of the real estate (herein referred to as the "network venue owner") where the physical wireless network infrastructure (including the enterprise AP hardware) is deployed. The owners of the WLANS that run on the physical wireless network infrastructure are preferably the service providers (SP) or carriers that leases the virtual AP from the network venue owner.

According to certain embodiments, the network venue owner manages and controls the usage of the enterprise AP hardware resources. For example, the enterprise AP hardware can provide 8 to 16 virtual APs. The cost of a virtual AP is only a fraction of the cost a physical enterprise AP. Further, the management and troubleshooting of the APs can be reduced through centralized management by the venue owner that provides servicing of the physical AP network. The SP can create and operate the WLAN using the virtual AP. Thus, the SP can manage the WLAN without the need of deploying the enterprise AP hardware and associated infrastructure.

Figure 1:
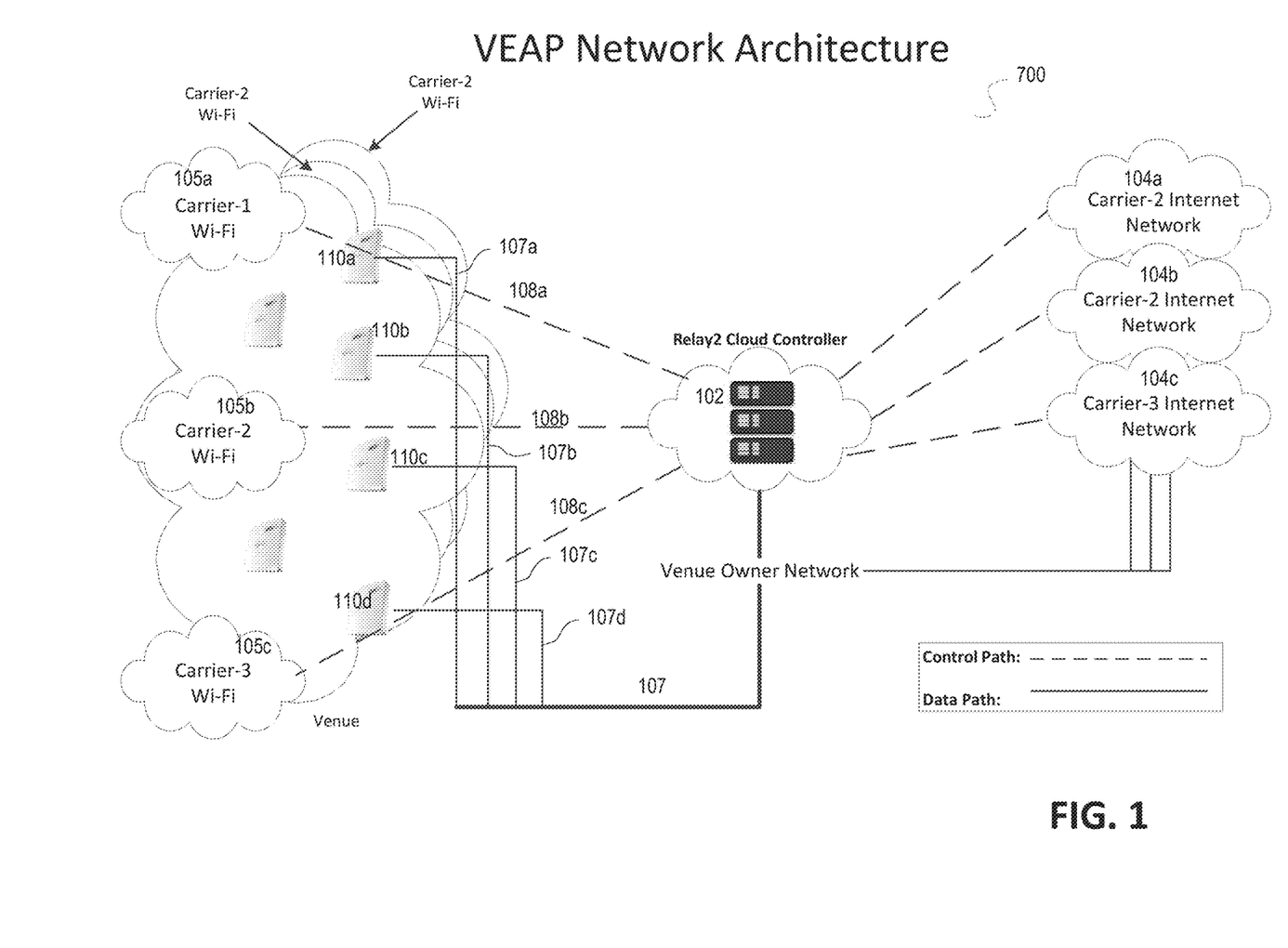
FIG. 1 is a high-level network diagram showing aspects of a virtual enterprise access point network architecture, according to certain embodiments.

FIG. 1 is a high-level network diagram showing aspects of a virtual enterprise access point network architecture, according to certain embodiments. FIG. 1 shows that the VEAP network architecture 100 includes a cloud controller 102, one or more carrier Internet networks 104a-c, one or more carrier WiFi 105a-c, and a plurality of APs 110a-d, according to certain embodiments. Cloud controller 102 controls the carrier WiFi 105a-c through control path 108a-c. Cloud controller 102 communicates with the plurality of APs 110a-d through data path 107a-d. The VEAP architecture leverages existing WiFi chipset vendor's virtual AP (VAP) technology for efficient vertical management through the cloud by external networks (e.g., carrier networks). According to certain embodiments, the management technology of the VAP provides network interfaces to the external networks. Further, the VEAP architecture provides multi-tenancy support for the multiple carriers to share the management of the AP infrastructure. The network venue owner (owner of the real estate and the AP hardware and infrastructure) is proficient in managing the venue. Thus, the network venue owner or manager can provide to the carriers/SPs, enterprise-grade virtual APs, high quality wireless network infrastructure services and remote centralized management of WLANs at a fraction of the price of deploying the enterprise-grade AP hardware and associated infrastructure, according to certain embodiments.

Thus, the above VEAP architecture benefits all parties of the WiFi networking services. Mobile clients receive enterprise-grade wireless networking services. The venue owners receive recurring revenue by leasing the AP infrastructure to multiple carriers/SPs. The carriers/SPs can operate high quality WLANs without having to buy and deploy costly enterprise-grade AP hardware. Thus, the carriers/SPs can use the savings to provide additional value-add services to the mobile clients and increase service revenue.

According to certain embodiments, the virtualization of the access points (AP) produces the benefit of allowing the access point hardware resources to be managed separately from the network resources. As non-limiting examples, access point hardware resources include radio space resources, memory, and Ethernet interface. As non-limiting examples, network resources include access point network bridges, Internet Protocol (IP) network, and network servers. According to certain embodiments, the venue owner or manager can manage and control the access point hardware and the resources associated with the access point hardware. The WLAN operators can manage and control the network resources and the virtual access points.

Further, according to certain embodiments, the AP resources can be virtualized. As a non-limiting example, a WLAN operator can lease the use of memory resources associated with the access points to one or more business entities (for example, one or more web commerce companies). In some cases, the venue owner/manager is also a carrier network. In such a case, the one or more web commerce companies can rent AP memory resources from the venue owner/manager. As non-limiting examples, the one or more web commerce companies can lease memory resources for advertising and promotion activities, application storage, video storage, content storage, client traffic analysis, internet access control, application distribution, and content distribution, according to certain embodiments. The WLAN operators can also use their AP memory resources that they have not leased out to web commerce companies or other companies for similar purposes such as advertising and promotion activities, application storage, video storage, content storage, client traffic analysis, internet access control, application distribution, and content distribution, etc.

According to certain embodiments, the cloud controller is a multi-tenancy cloud controller. The multi-tenancy cloud controller comprises multiple cluster servers that are running separate tenant controllers or virtual controllers. According to certain embodiments, a cloud site controller manager (SCM) is used for helping a given AP identify the AP's corresponding virtual controller from among the cluster servers. For example, when a given AP sends out a "control and provisioning of wireless access points" (CAPWAP) discovery request, the SCM intercepts this CAPWAP request. The CAPWAP request includes the media access control address (MAC address) of the AP and a certificate for specific tenant account associated with the AP. Thus, the SCM can look up the AP's MAC address and return the address of the specific tenant controller associated with the particular AP to that AP. The AP can then directly initiate a CAPWAP protocol session using the correct tenant controller address rather than using a trial-and-error method of sending a request to each tenant controller.

Figure 2:
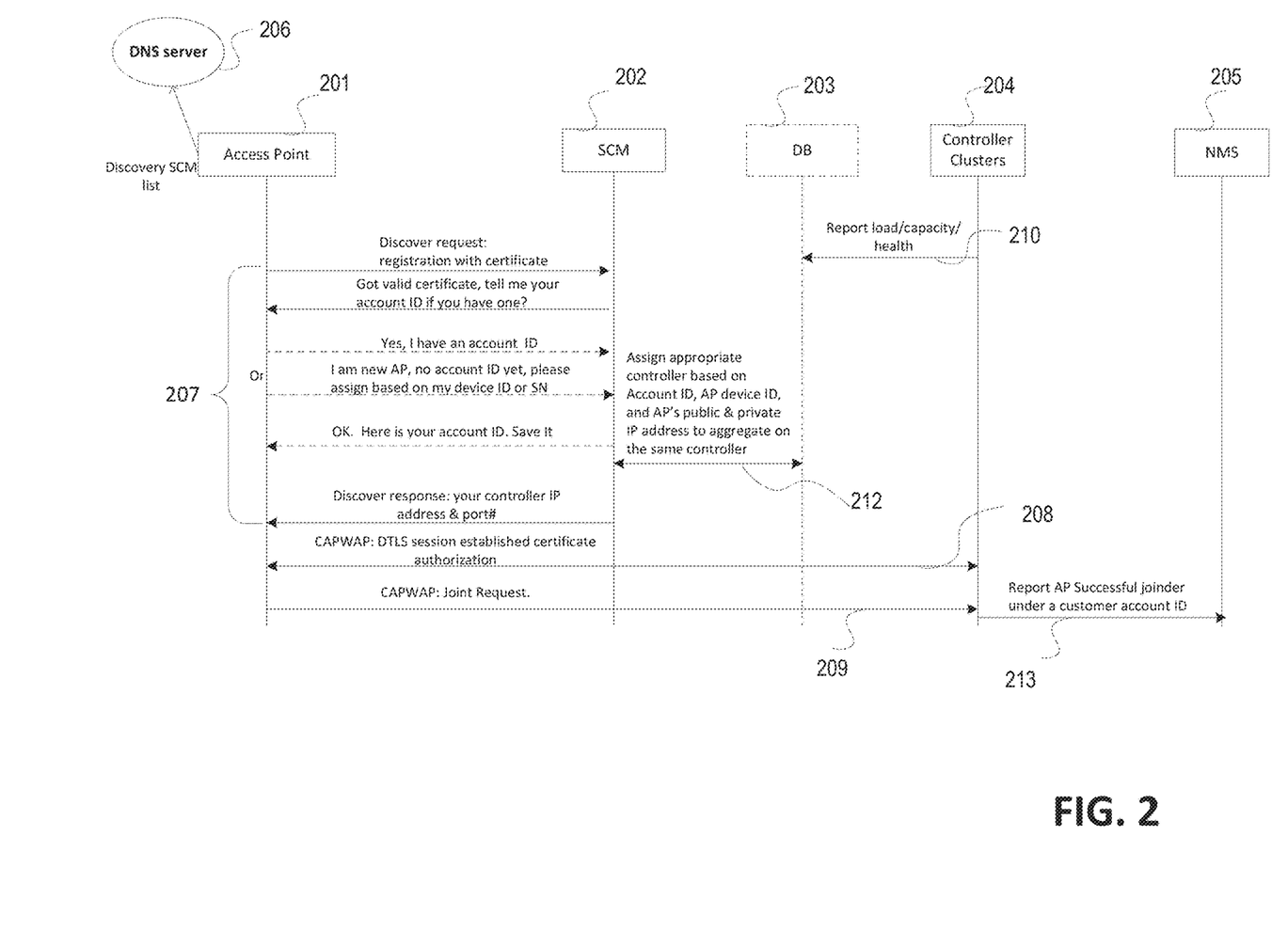
FIG. 2 is a high-level reference diagram showing aspects of discovery and registration protocol associated with access points, according to certain embodiments.

FIG. 2 is a high-level reference diagram showing aspects of a discovery and registration protocol associated with access points, according to certain embodiments. FIG. 2 shows AP 201, SCM 202, database 203, server clusters (or controller clusters) 204, network management system 205, and DNS server 206. SCM 202 and AP 201 communicate (see 207) to assign an appropriate tenant controller 212 to AP 201 (based on the assigned tenant account ID, a device ID of the AP, a private IP address of the AP, and a public IP address of the AP, for example), to establish a data transport layer security (DTLS) session 208 between AP 201 and the corresponding tenant controller in server clusters/controller clusters 204. The AP 201 can discover a list of SCMs from DNS server 206. When the DTLS session 208 is established, the AP can send a "join" request 209 to the AP's corresponding tenant controller in the server clusters/controller clusters 204. When the joinder is successful, the tenant controller reports the AP's successful joinder 213. Further, the tenant controllers and other server clusters can report information 210 to the database 203. Such information can include load, capacity and health of the controller.

According to another aspect of certain embodiments, the SCM also serves as a coordinator among the multiple data center locations for AP distribution under the VEAP network architecture as described herein. Under the VEAP network architecture, the data center locations are transparent to the venue owners. According to certain embodiments, each data center can be accessed by any AP under the VEAP network architecture. The data center provides services to any venue owner as a primary site or a backup site. Any given AP deployed at a venue owner's premises can automatically determine its corresponding data center and connect to it without requiring configuration by the venue owner. Thus, the data center needs to be automatically discoverable by the AP. The SCM can be a coordinator among the data centers and within a data center such that the APs that are deployed at a venue owner's premises can join the appropriate data center and the corresponding tenant controller in the data center.

The SCM is the first contact point in each data center. According to certain embodiments, the SCM has the following characteristics: 1) An SCM is deployed at each data center and the SCM is the first point of contact. The SCM has the requisite knowledge for redirecting the AP's discovery request to the appropriate data center and to the correct tenant controller within that data center to establish a session between the AP and its corresponding tenant controller; 2) The SCM can deterministically redirect and aggregate the AP connection to the correct data center location instead of spreading APs from the same regional location across different data center locations; 3) A list of SCMs are discoverable by any given AP using the standard DNS protocol. An AP can contact any of the SCM using the DNS information (DNS record). Thus, an AP can contact the list of SCM in a round robin manner to find the appropriate data center location for registration. Once the registration is successful, the AP can cache the address of the SCM for subsequent boot up or start up registration request.

According to certain embodiments, cloud-based site-to-site VPN networking is used to obviate problems associated with traditional hardware VPN gateway solutions for branch offices of a company. The cloud-based site-to-site VPN networking avoids the high cost of deployment and maintenance associated with a separate VPN gateway at each office site of the company.

According to certain embodiments, the cloud-based site-to-site VPN network includes: 1) a software implemented VPN gateway (soft VPN gateway), and 2) a cloud VPN controller. The AP deployed at company's branch office site can be configured to run as a soft VPN gateway that can execute policies pushed down from the cloud VPN controller for real-time traffic policing. The cloud VPN controller provides central VPN policy management and VPN tunnel networking. Thus, the cloud-based site-to-site VPN network is a software solution that enables IT personnel to easily modify/update VPN traffic routing paths dynamically between various sites without the need to install or access hardware VPN gateways on each site. Companies that adopt a cloud-based solution for wireless networking are likely to also adopt a cloud-based VPN solution for connecting the company's branch offices, retail stores, point-of-sale sites, etc. Thus, the VPN market runs in the billions of dollars.

Figure 3:
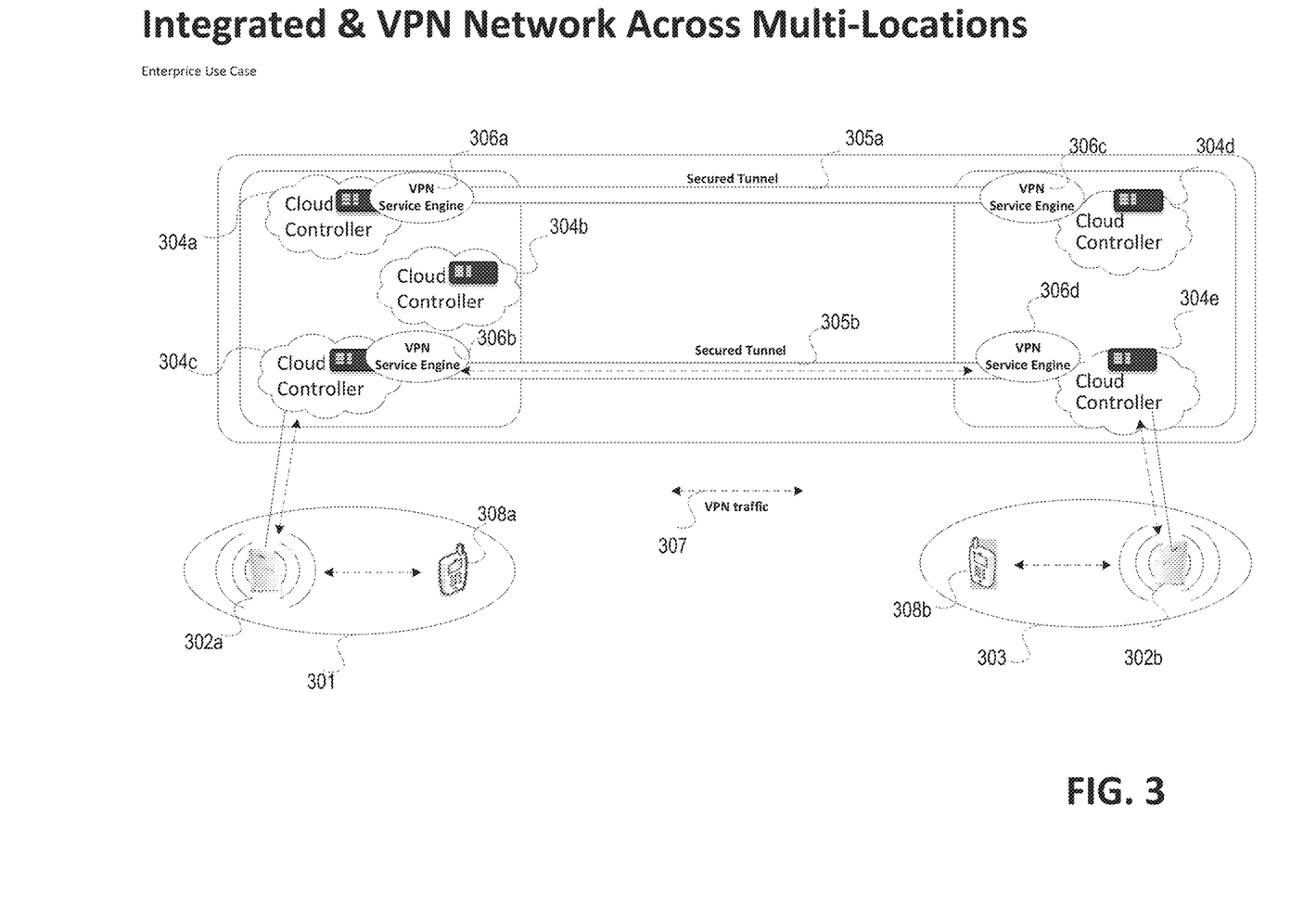
FIG. 3 is a high-level network diagram showing aspects of cloud-based site-to-site VPN dynamic connection, according to certain embodiments.

FIG. 3 is a high-level network diagram showing aspects of a cloud-based site-to-site VPN dynamic connection, according to certain embodiments. FIG. 3 shows that the cloud-based VPN network includes cloud enterprise WLAN controllers 304a-e, VPN service engines 306a-d, APs 302a-b and secure tunnels 305a-b. APs 302a-b run as soft VPN gateways. For example, AP 302a runs as a soft VPN gateway at company site 301. AP 302b runs as a soft VPN gateway at company site 303. Cloud enterprise WLAN controllers 304c, 304e provide central VPN policy management to AP 302a, 302b, respectively. VPN service engines 306a-d, dynamically provide secure tunnels 305a-b for VPN traffic 307 between company sites 301, 303. Wireless devices 308a, 308b communicate via their respective APs 302a, 302b and cloud enterprise WLAN controllers 304c, 304e and corresponding secure tunnel 305b.

With respect to traditional hardware-implemented enterprise WLAN controllers, each hardware controller is physically connected to a group of APs. Thus, the group of APs can be configured and managed in a batch. However, in the case of cloud-based controllers for WLANs as described herein, the APs are not physically connected to the controller. Thus, such a set of APs are not grouped in the traditional sense. It will be difficult to apply batch configuration to a large number of APs at a given venue owner's site and that are associated with cloud-based WLAN controllers. According to certain embodiments, wireless mobility domains are created to facilitate batch configuration of the APs that are associated with cloud-based WLAN controllers. According to certain embodiments, a wireless mobility domain defines a group of APs that are managed under the same domain. The APs in a given wireless mobility domain are geo located relatively close to each other and to the wireless clients that the APs are serving. The APs in a given wireless mobility domain share the same WLAN configuration and policies. For example, a wireless mobility domain can be used to define the scope of the APs deployed at a particular location, such as each company branch office that is remotely located from the company headquarters. In the example above, the wireless mobility domain for each company branch office can have a different WLAN management configuration. Thus, the IT personnel of the company can easily and flexibly apply different WLAN network settings and policies at each branch office through the use of the wireless mobility domain.

Figure 4:
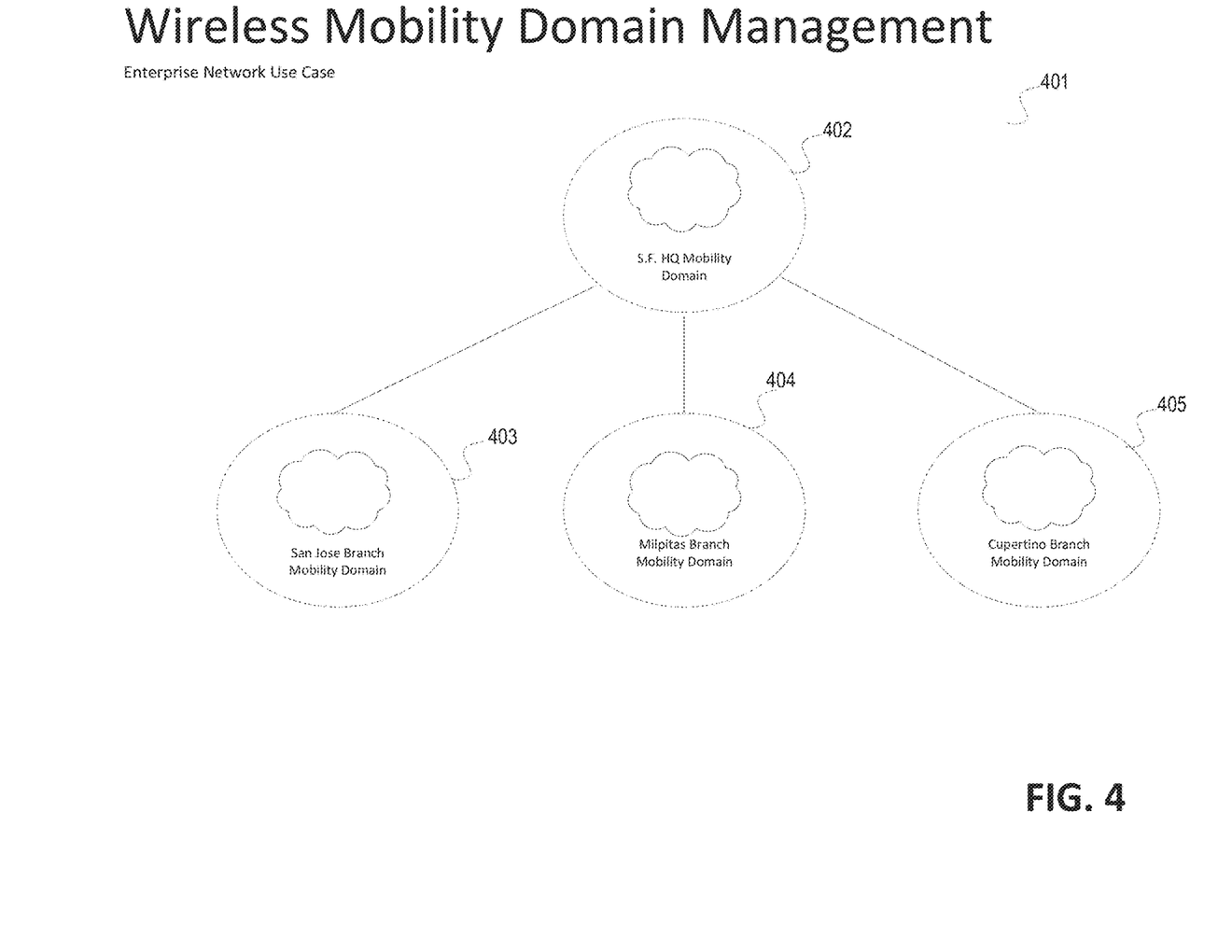
FIG. 4 is a high-level reference diagram showing aspects of management of wireless mobility domains, according to certain embodiments.

FIG. 4 is a high-level reference diagram showing aspects of the management of APs through the use of wireless mobility domains, according to certain embodiments. FIG. 4 shows a wireless mobility domain network 401 that includes a headquarters wireless mobility domain 402 and corresponding branch wireless mobility domains 403, 404, and 405. The wireless mobility domains 402, 403, 404, and 405 can have different WLAN settings and policies.

In another example, assume that a university campus has APs deployed in each of its department buildings. The university has the option of using one wireless mobility domain to manage all the APs on the university campus or use a separate wireless mobility domain for each of its departments for assets tracking or for different management purposes that are specific to each department or each floor within the same location.

L3 (Layer 3) mobility or roaming is a feature of enterprise WLANs that provides seamless wireless connectivity for a wireless client that is roaming across different corporate subnets. For example, if the company has adequate WLAN RF coverage, then the L3 mobility can enable real-time applications such as VOIP and video streaming to run uninterrupted on wireless clients (such as smart phones, tablets or notebooks) while the wireless client roams around the company campus.

To achieve L3 mobility, the WLAN product needs to perform the following: 1) fast handover of the wireless client's connection from one AP to another, and 2) maintain the same IP address of the wireless client across different subnet domains.

Fast handover is needed in order to avoid interruption or disconnection of the real-time application running on the wireless client. To perform fast handover of the wireless client's connection from one AP to another, the time needed to re-authenticate at the new AP to which the wireless client has roamed needs to be less than 40 ms or in some cases less than 20 ms depending on the application. Re-authentication at the new AP is also referred to as "re-association" with the new AP. If the time needed to re-authenticate at the new AP is greater than 20 ms then jitter or disconnection can occur for real time applications such as VOIP. The time needed for authentication is about 40 ms-80 ms in a good LAN environment with a 802.1X port based access control AAA server.

Further, when the wireless client roams to a new AP that is associated with a subnet that has a different network address, the wireless client will obtain the IP address of the subnet. When the wireless client's IP address is changed to the newly obtained IP address, the application (e.g., VOIP or video streaming) that is running on the wireless client is disrupted. Such disruptions are unsuitable for business communications and are inadequate for maintaining network security policies.

To provide adequate Layer 3 (L3) mobility, traditional enterprise WLANs use a centrally located hardware controller as the sole authenticator when wireless clients roam from AP to AP to obviate the need to perform a full re-authentication at each AP during roaming. The central hardware controller can easily set up an IP tunnel between the central controller and the wireless client's home subnet where the wireless client's IP address was originally assigned so that the wireless client can continue to use its original IP address. However, the traditional hardware controller solution is not applicable to WLANs using cloud-based controllers for a company/corporation network because there is no centrally installed controller with respect to the company network. Being in the cloud (internet), the cloud-based controllers are not able to perform fast handovers due to the occurrence of Internet latency, which can be unpredictable and long lasting. Further, since the cloud-based controller is in the cloud and not in a central location in a corporate WLAN, the cloud-based controller is not able to set up an IP tunnel between the wireless client's home subnet and the cloud-based controller. Also, the cloud-based controller will not be able to maintain L3 mobility for the wireless client if the Internet connection is down.

In view of the above, according to certain embodiments, the following methods are used to support L3 mobility in WLANS using cloud-based controllers: 1) predict client roaming range, and 2) use a roaming anchor AP.

According to certain embodiments, client roaming range prediction is used in association with enabling the fast handover function by reducing the number of round trips during the re-authentication/re-association process of the wireless client at each AP during roaming by the wireless client. The number of round trips can be reduced by caching or otherwise storing the master session key (MSK) that is generated during part of the authentication process at an initial AP (before the wireless client starts to roam). The cloud controller can copy the MSK into the new AP that the wireless client roams to. Thus, when the wireless client roams to that new AP, the new AP need only re-generate the traffic key (TK) to complete the re-authentication/re-association process, rather than performing a full re-authentication process with the backend AAA server. In order for the MSK to be copied into the appropriate AP, the cloud controller needs to know ahead of time which AP the wireless client will roam to. According to certain embodiments, the MSK of each wireless client can be copied into all the APs in the company network. Such a method is useful for a small number of APs such that the APs are not overwhelmed with a large number of keys. According to another embodiment, the MSK of the wireless client is copied only to a set of APs that the wireless client can possibly roam to, and an age-out timer is implemented to remove the MSK from such APs to avoid clogging up the APs with keys. To explain, the range of neighboring APs ("roaming range") that the wireless client can roam to is deterministically identified, according to certain embodiments.

Figure 5:
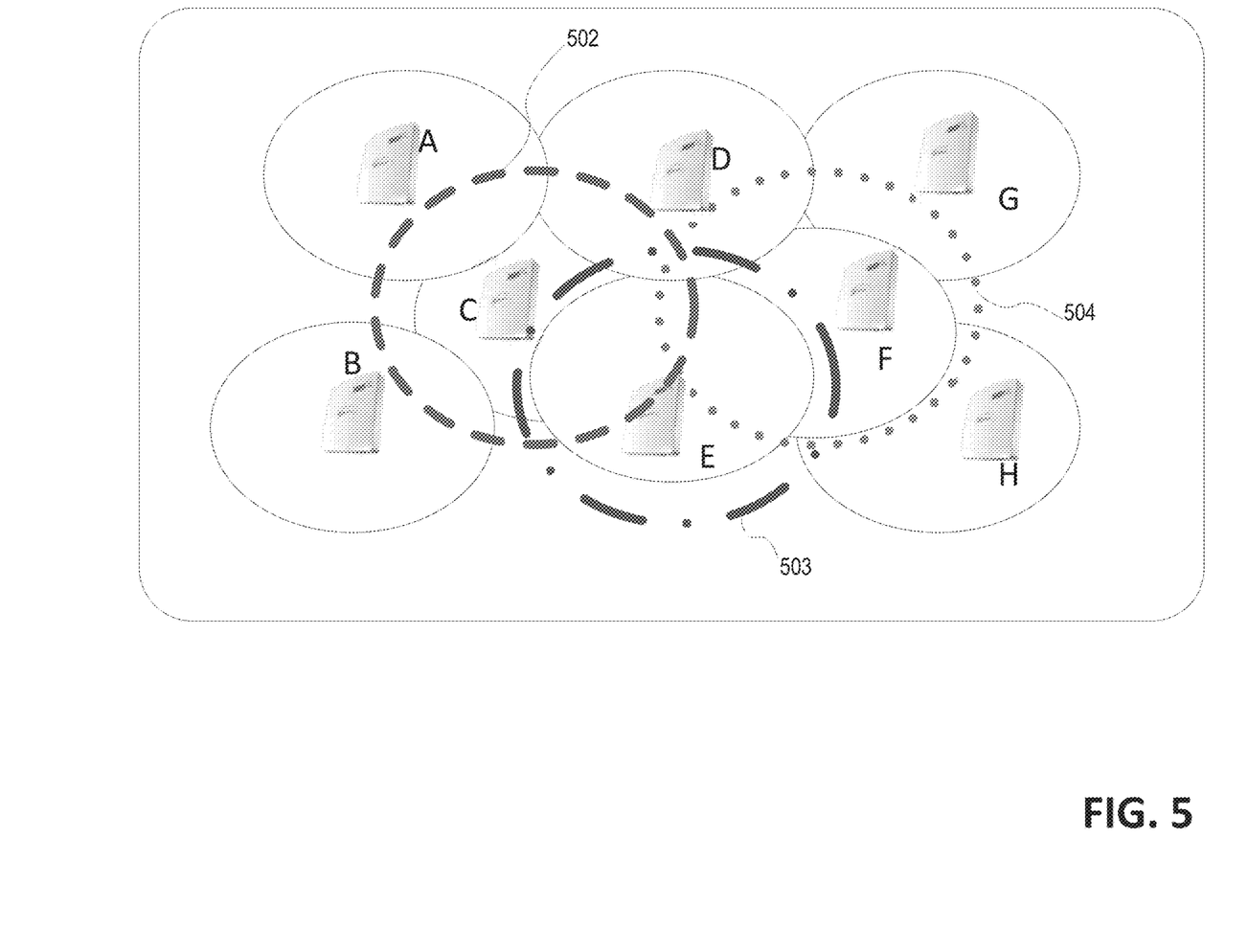
FIG. 5 is a high-level reference diagram showing aspects of roaming range prediction, according to certain embodiments.
Figure 9:
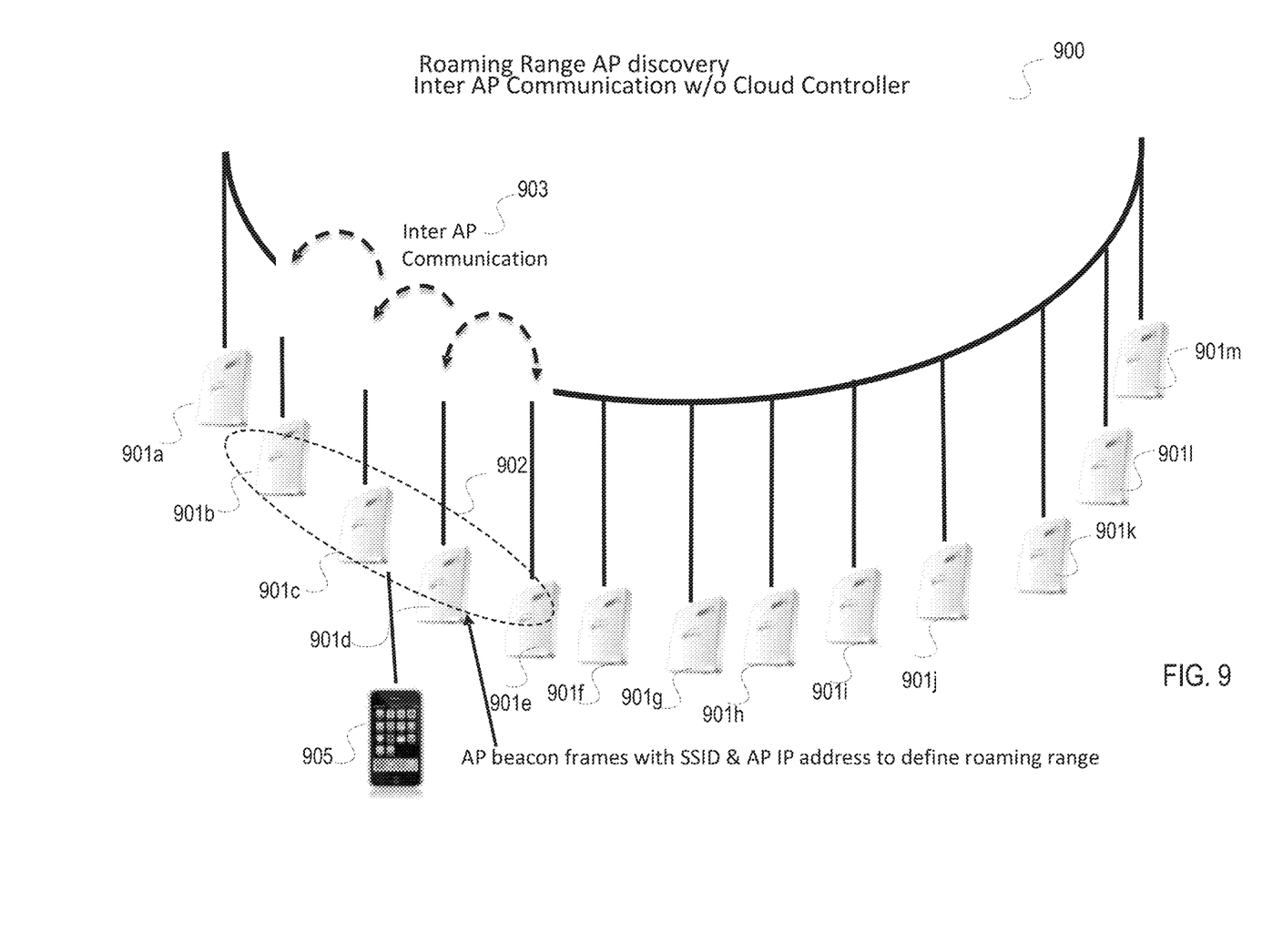
FIG. 9 is a high-level network diagram showing aspects of inter-AP communication, according to certain embodiments.

FIG. 5 is a high-level reference diagram showing aspects of predicting the roaming range of a wireless client, according to certain embodiments. FIG. 5 shows APs 'A', 'B', 'C', 'D', 'E', 'F', 'G', 'H'. The embodiments can include any number of APs but only eight Aps are shown for ease of description. When a wireless client is first associated with AP 'C', it is predicted that the roaming range of the wireless client includes the neighbors 'A', 'B', 'D', 'E' shown by the green dashed line 502. When the wireless client moves to 'E', then it is predicted that the roaming range of the wireless client includes the neighbors 'C', 'D', 'F', 'H' shown by the red dashed line 503. Similarly, when the wireless client moves to 'F', then it is predicted that the roaming range of the wireless client includes the neighbors 'D', 'E', 'H', 'G' shown by the blue dashed line 504, etc. Thus, the MSK can be copied to a limited set of APs in the roaming range of the wireless client rather than being copied into all the APs in the owner's venue or company network. However, if the cloud-based controller is not reachable, for example when the company's WAN or the Internet is down, then there is no cloud controller to copy the MSK into the APs in the predicted roaming range of the wireless client. According to certain embodiments, FIG. 9 is a high-level network diagram showing aspects of inter-AP communication. FIG. 9 shows a corporate WLAN 900, APs 901a-m, roaming range 902, inter-AP communication 903, and wireless client 905. According to certain embodiments, when the cloud-based controller is not reachable to copy the MSK into the APs in the predicted roaming range 902 of the wireless client 905, then the APs 901a-m can perform inter-AP communication 903 via back-hauled wired network interface to exchange MSK and other information that is needed among the APs in the roaming range of the wireless client 905. APs that are 802.11 compliant, periodically broadcast beacon frames that the wireless client 905 can detect. According to certain embodiments, the AP has the WLAN SSID and AP IP address embedded as an 802.11 vendor-specific IE (information element) in the AP's beacon frames. The beacon frames that carry such 802.11 vendor-specific IE and that are broadcast will be received only by the APs in the roaming range. The APs that are outside the roaming range will not receive such broadcasted beacon frames. Thus, the APs within the roaming range can detect each other and communicate and exchange MSK information with each without a connection to the cloud controller. Similarly, inter-AP communication can be applied to provide functions described herein with respect to "roaming anchor APs."

Figure 6:
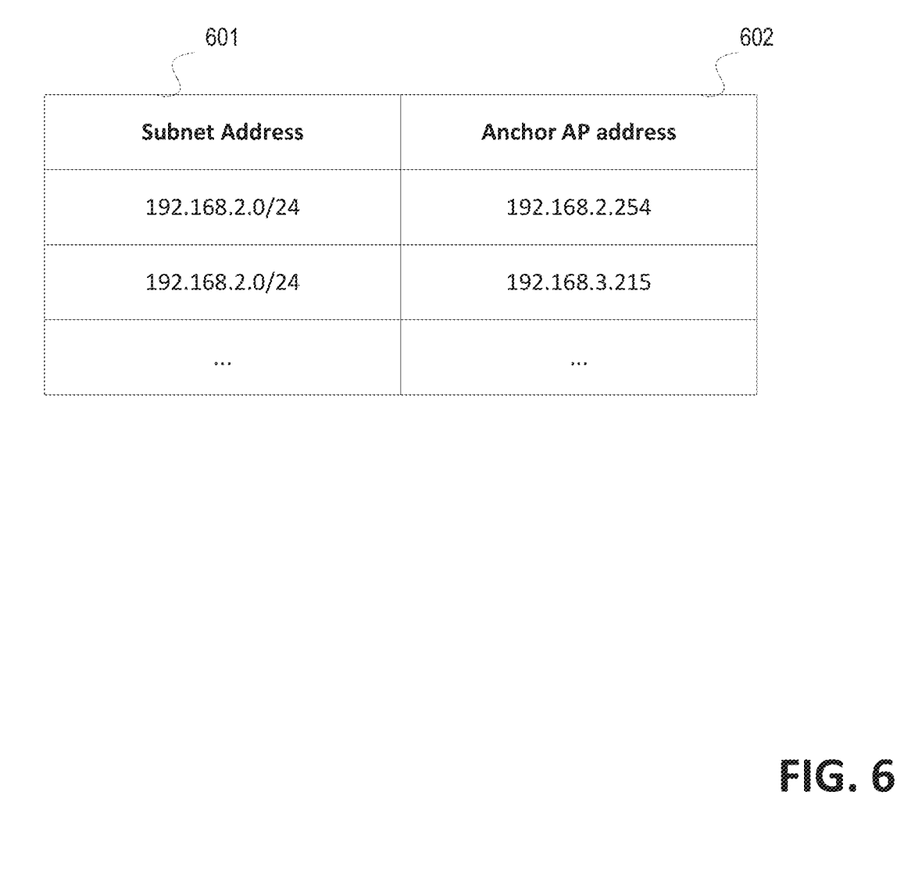
FIG. 6 is a table of sample data format of subnet address information and roaming anchor AP address, according to certain embodiments.

According to certain embodiments, a roaming anchor AP is used for enabling the wireless client to keep the same IP address as the wireless client roams from AP to AP within the same subnet or roaming to different subnets. The roaming anchor AP is the AP where the wireless client initially obtained its IP address from the subnet. The roaming anchor AP becomes the anchor point for the roaming wireless client. The cloud controller can post the IP address information of the roaming anchor AP to the neighbor APs of the roaming anchor AP. For example, when the wireless client roams to a neighboring AP, then the neighboring AP (e.g. 'X') can form an IP tunnel with the roaming anchor AP so that the wireless client can keep its original IP address. When the wireless client roams to yet another AP (e.g., 'Y'), then a new IP tunnel is formed between 'Y' and the roaming anchor AP rather than with 'X'. Such a method of forming IP tunnels avoids overloading the APs with proliferation of too many IP tunnels. Further, since the information of the roaming anchor AP is stored at each AP, L3 mobility function remains viable even when a given AP has lost connection to the cloud controller. In the case when the cloud controller is not available initially when wireless client obtains its original IP address to determine the roaming wireless client's anchor AP, the use of broadcast beacon frames for Inter AP communication described above can be applied to provide the anchor AP information to the "roaming range" APs. FIG. 6 is a table of sample data format of subnet address information 601 and roaming anchor AP address 602, according to certain embodiments.

Figure 7:
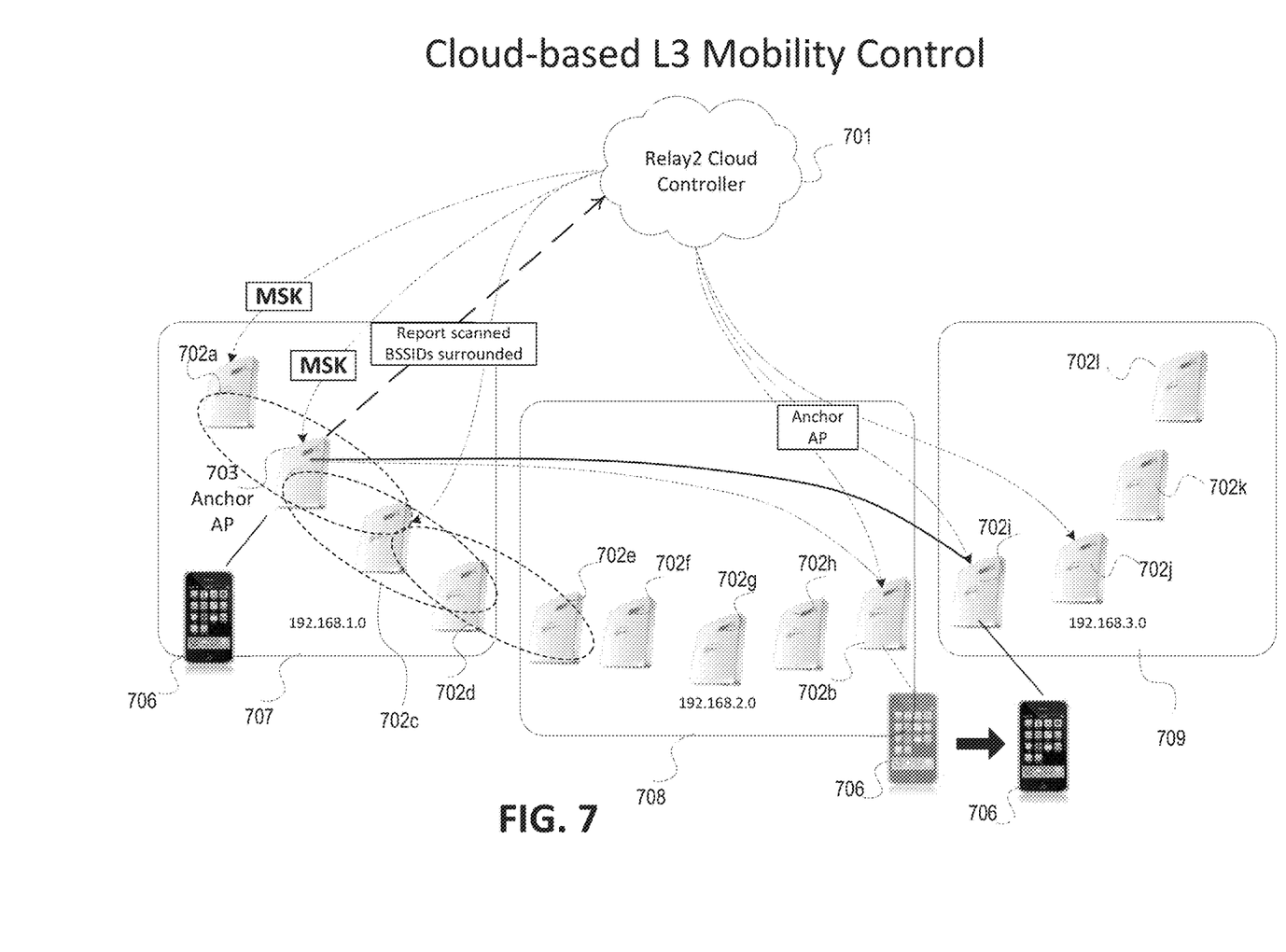
FIG. 7 is a high-level network diagram showing aspects of cloud-based layer 3 mobility control, according to certain embodiments.

FIG. 7 is a high-level network diagram showing aspects of cloud-based layer 3 mobility control, according to certain embodiments. FIG. 7 shows a cloud controller 701, APs 702a-1, roaming anchor AP 703, wireless client 706, and subnets 707, 708 and 709. To control L3 mobility, cloud controller 701 copies MSK into the "neighbor APs' in the roaming range of the wireless client 706. To maintain the IP address of wireless client 706, IP tunnels are formed between the roaming anchor AP and a given AP 702 as the wireless client 706 roams from subnet 707 to subnet 708 to subnet 709, for example. The methods for controlling L3 mobility as described herein can be used for large enterprise office networks using cloud-based controllers to provide continuous wireless VOIP communication and network security policies for mobile devices.

According to certain embodiments, the "neighbor APs" in the roaming range of the wireless client device sends radio signal strength index (RSSI) information associated with the client device to the cloud controller. Further, the access points in a given roaming range exchange information amongst themselves via wifi or a wired network interface. The exchanged information includes WLAN SSID (service set identification) information and IP address information of each respective access point in the roaming range of access points.

The Control And Provisioning of Wireless Access Points ("CAPWAP") is an interoperable protocol that enables a controller to manage a collection of wireless access points. CAPWAP protocol includes the use of UDP port 5246 for control channel and port 5247 for data channel. The CAPWAP standard enables configuration management and device management to be pushed to the AP. The CAPWAP protocol includes several phases: 1) Discovery, 2) Join, 3) Configuration, 4) Firmware Update, and 5) Management. The existing CAPWAP discovery protocol does not work over the Internet because the UDP broadcasting is limited to the company network and does not get forwarded to the Internet. Further, the firewall inside the enterprise network may also block UDP unicast to the Internet. The CAPWAP discovery protocol works only with a dedicated and preconfigured hardware controller. The CAPWAP discovery protocol is not able to discover virtual controllers that are implemented in a multi-tenant cloud structure, as described herein.

According to certain embodiments, a cloud controller CAPWAP discovery protocol that uses the standard HTTPS (Hypertext Transfer Protocol Secure) protocol is used to replace the traditional CAPWAP for use in the multi-tenant cloud structure that is described herein. The cloud controller CAPWAP discovery protocol can solve potential firewall problems associated with the enterprise network. The cloud controller CAPWAP discovery protocol first discovers the corresponding virtual controller and negotiates the appropriate transportation protocol. For example, the transportation protocol can be the original UDP protocol or the HTTP (Hypertext Transfer Protocol) protocol depending on the enterprise network firewall condition. UDP is the preferred transportation for the cloud-based controller because the HTTP session can cause scaling problems with respect to cloud resources. The cloud controller CAPWAP discovery protocol optimizes the resource usage in the cloud-based controller. The cloud controller CAPWAP discovery protocol creates the first step in extending the CAPWAP protocol to the external Internet network instead of limiting it within the company's private LAN or VPN network. Thus, the cloud-based CAPWAP discovery protocol in conjunction with the cloud-based controller provides an Internet solution rather than being confined to using an internal company network or VPN over a wide area network such as multi-protocol label switching virtual private network (MPLS VPN).

Depending on the result of discovery phase, the cloud-based CAPWAP discovery protocol can negotiate the use of HTTP protocol for the AP in order to join and communicate with the cloud-based controller when the company firewall blocks the UDP protocol to the Internet. According to certain embodiments, in order to preserve compatibility with the legacy CAPWAP UDP protocol, the cloud-based CAPWAP UDP protocol is delivered over an HTTP tunnel. Both the AP and cloud-based controller can optionally encapsulate and decapsulate the CAPWAP UDP packets with the HTTP protocol. The HTTP protocol is a TCP transportation protocol, which is completely different than the UDP transportation. Each UDP packet has a packet boundary indication that is honored upon receipt. The length of the entire message that was sent originally is known through a read operation of the UDP message at the receiver side. In contrast, TCP protocol data is read as a byte stream, and no distinguishing indications are transmitted to signal message boundaries. Further, because of the TCP protocol data is read as a byte stream, the chances that there is a reading disruption by the receiver in the middle of the UDP original message packet is very high. According to certain embodiments, a proprietary lightweight protocol that includes UDP packet boundaries indication in the HTTP protocol is used. Further, such a lightweight protocol also maintains the protocol in a manner to ensure that the reading of the UDP message at the receiver side is not broken in the middle of the original UDP packet. Such a protocol completes the CAPWAP protocol migration from the corporate LAN environment to the Internet environment (cloud environment) while still maintaining compatibility with the original standard CAPWAP UDP protocol to ensure interoperability with legacy enterprise APs and/or legacy enterprise controllers.

According to certain embodiments, the AP has the intelligence to switch over from a CAPWAP over a Datagram Transport Layer Security (DTLS) protocol to a CAPWAP over HTTP protocol when the AP detects a firewall between the AP and the corresponding cloud controller. In other words, after discovery is complete, as a default, a given AP will use CAPWAP over DTLS protocol to connect and communicate with the cloud controller with respect to secure communication of data transportation in UDP when there is no firewall between the AP and the cloud controller. However, if there is a firewall between the AP and the cloud controller, then the AP is intelligent enough to detect the firewall and will connect and communicate with the cloud controller using HTTP or HTTPs protocol.

To capture packet traces such as all HTTP URL/Headers from a high-speed network link and store such traces in a hard disk for further post-processing requires high-cost hardware platforms or an optimized OS networking stack to reduce the number of memory copies. However, general operating systems are not developed with an optimized networking stack or for a low-cost platform such as retail WiFi AP or even an enterprise-grade light AP. Thus, it is a challenge to collect high-speed packet traces without trade-offs in the AP performance.

In general operating systems, the path to store captured network packets to the hard disk includes the following: 1) a network processor performs deep packet inspection to filter the captured packets, 2) the network processor captures the packets and copies the packets to a DMA (direct memory access) and causes the CPU to wake up the OS and schedules a user space software application to read and write to a disk file, and 3) OS File System operations are costly and use a large amount of CPU time especially for writing data to disk file. For example, in a Linux EXT3 file system, the CPU usage is from 27%-99% depending on the type of data operation. Further, when capturing and storing packets using a high-speed network link to disk file, the CPU usage is significant and can impact the AP performance.

According to certain embodiments, a fast path of storing packets from the AP network processor to the AP's hard disk is used. According to certain embodiments, after the AP network processor captures the packets and stores the data on the DMA, instead of waking up the AP's OS to reschedule the user-space software application to read and write the data to an AP disk file, the AP's OS is designed to call an AP kernel-space driver to directly transfer the data from DMA to the AP's hard disk and thus bypasses the AP's OS File System completely. The kernel-space driver CPU usage is relatively small. However, the trade off is that the data saved on the disk cannot be in the format that the general OS File System can process. Thus, according to certain embodiments, instead of reading the data from the disk file via the OS File System of the AP, a kernel driver API is used to read the data directly from the disk where the packets are stored for the user-space read/write application. Such a process again bypasses the AP's OS File System operation. Such a method eliminates the round-trip File System I/O process for each captured packet trace. The method is almost a direct hardware copy from the network processor to the hard disk using very little CPU time.

Figure 8:
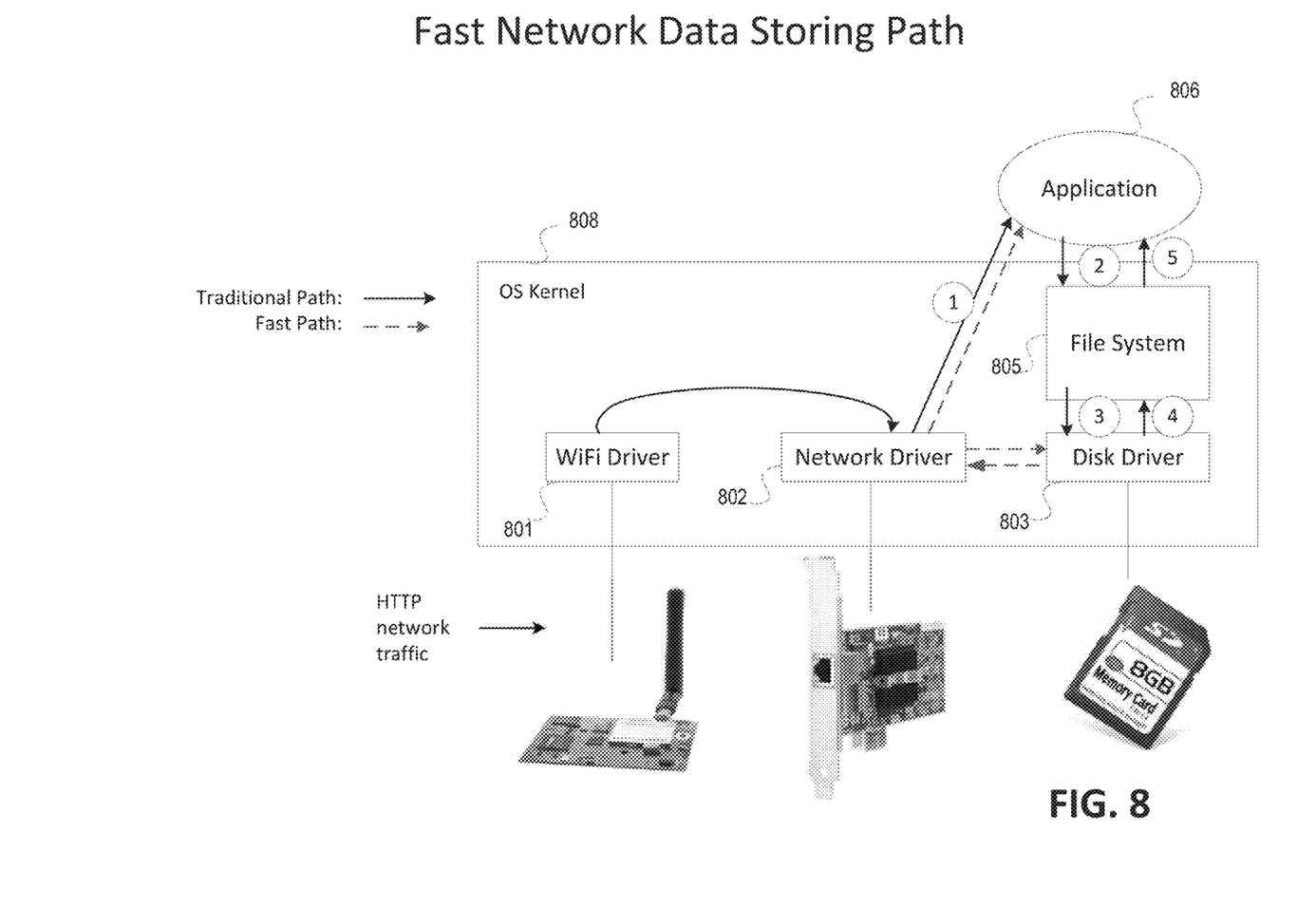
FIG. 8 is a high-level network diagram showing aspects of a design for a fast network data storing path in an access point (AP), according to certain embodiments.

FIG. 8 is a high-level network diagram showing aspects of a design for a fast network data storing path in an access point (AP), according to certain embodiments. FIG. 8 shows an AP WiFi driver 801, an AP network driver 802, an AP disk driver 803, an AP OS File System 805, a read/write application 806, and an AP OS kernel 808. The fast path for data storing is shown in red (dashed arrows), whereby the network driver 802 bypasses OS File System 805 and uses the read/write application 806 to write data to the AP hard disk.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

I claim:

1. A method comprising: receiving, by a cloud site controller manager, a discovery request sent by a particular WiFi access point, the particular WiFi access point generating a plurality of virtualized WiFi access points at a physical location, each virtualized WiFi access point being capable of remote, secure and independent configuration by a WLAN tenant, the discovery request including media access control address information and tenant account information associated with a particular tenant of the particular WiFi access point when a record in a database accessible by the cloud site controller manager indicates that, on behalf of the particular tenant, the particular WiFi access point has been previously assigned to a particular tenant controller of a plurality of tenant controllers managed by the cloud site controller manager;
   identifying an IP address and port information of the particular tenant controller associated with the tenant account information when the record in the database indicates that, on behalf of the particular tenant, the particular WiFi access point has been previously assigned to the particular tenant controller of the plurality of tenant controllers;
   identifying the IP address and port information of the particular tenant controller, assigning to the particular WiFi access point a tenant account ID when the particular WiFi access point does not already have a tenant account ID, assigning on behalf of the particular tenant the particular WiFi access point to the particular tenant controller based on the newly assigned tenant account ID, a device ID of the particular WiFi access point, a private IP address of the particular WiFi access point, or a public IP address of the particular WiFi access point so that WiFi access points associated with a regional location are assigned to corresponding tenant controllers in a same data center, when no record in the database indicates that the particular WiFi access point has been previously assigned to any tenant controller of the plurality of tenant controllers on behalf of the particular tenant; and
   sending the IP address and port information to the particular WiFi access point to support establishment of a data transport layer security session between the particular WiFi access point and the particular tenant controller of the plurality of tenant controllers.

2. The method of claim 1, further comprising receiving information about the plurality of tenant controllers from a plurality of server clusters associated with the plurality of tenant controllers.

3. The method of claim 1, further comprising directing the particular WiFi access point to a specific site controller manager when the tenant account information is associated with a tenant controller corresponding to the specific site controller manager.

4. A wireless network comprising: a plurality of cloud site controller managers, each cloud site controller manager of at least a subset of the plurality of cloud site controller managers being associated with at least one corresponding data center;
   wherein at least one cloud site controller manager of the plurality of cloud site controller managers: receives a discovery request sent by a particular WiFi access point, the particular WiFi access point generating a plurality of virtualized WiFi access points at a physical location, each virtualized WiFi access point being capable of remote, secure and independent configuration by a WLAN tenant, the discovery request including media access control address information and tenant account information associated with a particular tenant of the particular WiFi access point when a record in a database accessible by the cloud site controller manager indicates that, on behalf of the particular tenant, the particular WiFi access point has been previously assigned to a particular tenant controller of a plurality of tenant controllers managed by the at least one cloud site controller manager;
   identifies an IP address and port information of the particular tenant controller associated with the tenant account information when the record in the database indicates that, on behalf of the particular tenant, the particular WiFi access point has been previously assigned to the particular tenant controller of the plurality of tenant controllers;
   identifies the IP address and port information of the particular tenant controller, assigns to the particular WiFi access point a tenant account ID when the particular WiFi access point does not already have a tenant account ID, assigns on behalf of the particular tenant the particular WiFi access point to the particular tenant controller based on the newly assigned tenant account ID, a device ID of the particular WiFi access point, a private IP address of the particular WiFi access point, or a public IP address of the particular WiFi access point so that WiFi access points associated with a regional location are assigned to corresponding tenant controllers in a same data center, when no record in the database indicates that the particular WiFi access point has been previously assigned to any tenant controller of the plurality of tenant controllers on behalf of the particular tenant; and
   sends the IP address and port information to the particular WiFi access point to support establishment of a data transport layer security session between the particular WiFi access point and the particular tenant controller of the plurality of tenant controllers.

5. The wireless network of claim 4, wherein the at least one cloud site controller manager of the plurality of cloud site controller managers receives information about the plurality of tenant controllers from a plurality of server clusters associated with the plurality of tenant controllers.

6. The wireless network of claim 4, wherein the at least one cloud site controller manager of the plurality of cloud site controller managers directs the particular WiFi access point to a specific site controller manager when the tenant account information is associated with a tenant controller corresponding to the specific site controller manager.

* * * * *